(12) United States Patent
Fritter et al.

(10) Patent No.: US 6,638,426 B1
(45) Date of Patent: Oct. 28, 2003

(54) WATER PURIFYING APPARATUS

(75) Inventors: Charles F. Fritter, Dublin, CA (US); Shrirang P. Netke, San Bruno, CA (US); Jonathan E. Scruggs, III, Oakland, CA (US); Stefan A. Gröss, Dreieich (DE)

(73) Assignee: The Clorox Company, Oakland, CA (US)

( * ) Notice: Subject to any disclaimer, the term of this patent is extended or adjusted under 35 U.S.C. 154(b) by 0 days.

(21) Appl. No.: 09/611,621

(22) Filed: Jul. 7, 2000

(51) Int. Cl.[7] .................. B01D 27/02; B01D 27/14
(52) U.S. Cl. .................. 210/266; 210/282; 210/472
(58) Field of Search .............. 210/257.2, 259, 210/266, 282, 472

(56) References Cited

U.S. PATENT DOCUMENTS

| | | | |
|---|---|---|---|
| 3,984,327 A | 10/1976 | May | 210/284 |
| 4,026,792 A | 5/1977 | Orth, Jr. | 210/669 |
| 4,306,971 A | 12/1981 | Hankammer | 210/282 |
| 4,623,457 A | 11/1986 | Hankammer | 210/237 |
| 4,725,354 A | 2/1988 | Thomsen et al. | 210/232 |
| 4,749,484 A | 6/1988 | Greenhut | 210/266 |
| 4,800,018 A | 1/1989 | Moser | 210/266 |
| 4,885,089 A | 12/1989 | Hankammer | 210/420 |
| 4,895,648 A | 1/1990 | Hankammer | 210/188 |
| 4,969,996 A | 11/1990 | Hankammer | 210/282 |
| 4,978,449 A | 12/1990 | Devine et al. | 210/264 |
| 5,049,272 A | 9/1991 | Nieweg | 210/266 |
| 5,370,793 A | * 12/1994 | Sugimoto | 210/259 |
| 5,449,454 A | 9/1995 | Hickok | 210/188 |
| 5,569,374 A | 10/1996 | Williams | 210/136 |
| 5,681,463 A | * 10/1997 | Shimizu et al. | 210/282 |

FOREIGN PATENT DOCUMENTS

WO    WO 99/48598    9/1999    .......... B01D/63/02

* cited by examiner

*Primary Examiner*—Ivars Cintins
(74) *Attorney, Agent, or Firm*—Michael J. Mazza

(57) ABSTRACT

A structure for venting of gasses from fluids, and in particular, venting of gasses from filter elements or filter media used in water treatment devices. The structure incorporates a fluid flow diverter having a vent tube, tangential flow diverter and a lower air collection space to vent air from an interface between stages of the filter cartridge. The vent structure is particularly suited to systems having a pressure drop of 1 psi or less, such as those systems which filter a fluid by a pressure differential generated by gravity alone, or aided by a manual pressurization means. There is also disclosed a multi-stage filter cartridge, incorporating the vent structure, and having an upper stage including granular carbon and a lower stage including a plurality of hollow fibers.

6 Claims, 6 Drawing Sheets

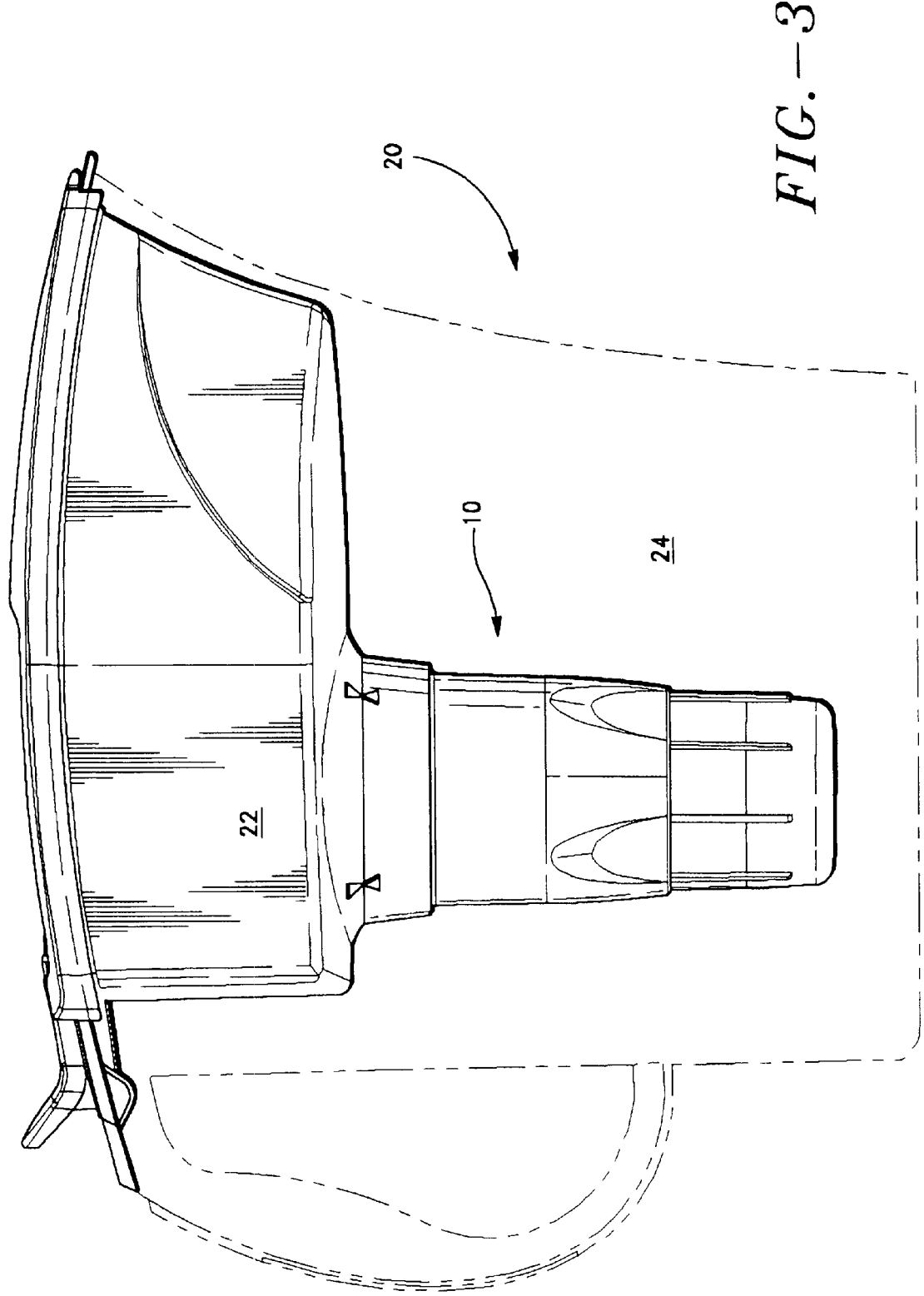

WATER PURIFYING APPARATUS

BACKGROUND OF THE INVENTION

Field of the Invention

The present invention relates to venting of gasses from fluids, and in particular, venting of gasses from filter elements or filter media used in water treatment devices.

In particular, this invention relates to a multi-stage filter cartridge that incorporates a fluid flow diverter to vent air from an interface between stages of the filter cartridge.

Major categories of domestic point-of-use (POU) systems include: a) plumbed-in or faucet-mounted systems that rely on the pressure of the water supply as the driving force for filtration, and b) non-plumbed pour-through or batch systems that rely on gravity to force water from an upper influent water chamber, through a filtering means and down to a lower effluent water chamber.

Typical POU systems known in the art employ various combinations of purification agents that remove contaminants by chemical or physical means. These purification agents may be present in forms such as, but not limited to porous, non-porous, granular, fibrous, filamentous or particulate. Examples of these purification agents include zeolites, ion exchange resins, activated carbons and mechanical filtration medias. Such agents remove contaminants from water through processes such as adsorption, chemical reaction and size exclusion. The use of such purification agents can result in air entrapment within filter cartridges because some agents are hydrophilic ("water-loving") and therefore air-impervious. Since the pressure available to a gravity driven filtration system is typically 1.0 pounds per square inch (PSI) or less, air trapped within the filter cartridge is unlikely to be forced out with the effluent water. But rather, because of its buoyancy, air tries to move upward through the cartridge. However, when the air encounters a wetted purification agent with a hydrophilic nature, it becomes trapped due to surface tension at the air/liquid interface.

A typical gravity driven system which has an upper reservoir, a filter, and a lower filtered water collection chamber is described in U.S. Pat. Nos. 4,895,648 and 4,969,996, both to Hankammer, the disclosures of which are incorporated by reference herein.

Thus, one problem to be overcome in designing filter cartridges for gravity-driven POU systems is the venting of air from the cartridge. During normal use of such cartridges, air is often trapped inside. This is particularly true for multi-stage filters where several purification agents of differing hydrophilicities are used. This trapped air can cause many problems including preventing the filter cartridge from functioning at maximum flow rate, causing channeling of the filtering water, or even result in filter lock-up where no water is flowing at all. When such a filter is new, air originally within the filter before use must be vented, and any time water flow through the filter cartridge is interrupted, accumulated air may need to be vented.

Examples of venting strategies are known in the art. Saito (U.S. Pat. No. 5,225,079) and Kawai (U.S. Pat. No. 4,772,390) both employ air-pervious, water-impervious membranes through which the trapped air is vented while at the same time preventing filter leakage. However, this strategy requires the relatively higher pressure of a plumbed-in or faucet-mounted filtration system to efficiently vent the trapped air in a reasonable amount of time. Hankammer (U.S. Pat. No. 4,895,648) teaches the use of a filter cover connected to a hollow tube that vents air from the top of the single stage or component filter. However, this method has three disadvantages: it only vents air that manages to rise to the top of the filter cartridge and cannot vent the air trapped near the bottom of the cartridge, the filter cover is external to the filter cartridge and thus can be inadvertently removed or lost by the user, and since this filter cover resides in the upper influent water chamber, water can enter the opening in the filter cover tube, block the air release ports at the top of the filter cartridge lid by surface tension, and cause filter lockup.

SUMMARY OF THE INVENTION

The present invention provides a means of venting air trapped at the bottom of the filter cartridge and unable to rise to the top, or which is internal to the filter cartridge. The structural configuration of the venting structure is such that it cannot be inadvertently blocked by the surface tension of water. The vent structure has utility in any apparatus wherein a gas is or becomes entrained or mixed with a fluid, and in particular where such gas may impede, slow or interfere with fluid flow, or where it is desirable to removes gases for any reason. In particular, a multi-stage filter having two or more filtration systems, arranged axially along the fluid flow path, results in an interface between stages which may generate, entrap or entrain air or gases within the fluid.

In particular, the vent structure is useful in systems having a pressure drop of 1 psi or less, such as those systems which filter a fluid by a pressure differential generated by gravity alone, or aided by a manual pressurization means. Pressure drop can be measured directly with a gauge, or can be calculated by measuring the vertical height of the water column across the structure to which the pressure drop applies.

As used herein the term "fluid communication" means a path by which liquids or gases may move between two or more structures. The term "liquid communication" means a path by which liquids may move between two or more structures. The term "multi-stage" means two or more stages. The term "potted" means fixing or sealing hollow fiber bundles to hold them in place and to provide a defined fluid flow pathway. Also as used herein, air and gases are used interchangeably, unless otherwise apparent from the context.

BRIEF DESCRIPTION OF THE DRAWINGS

FIG. 3 is an elevational view of the filter cartridge of the present invention, as installed in a pitcher;

It is an object of the present invention to provide an improved water-purifying apparatus of the type mentioned above which will achieve a maximum of hygiene, especially as regards elimination of unwanted germs, and an improvement in sealing.

It is another object of the present invention to provide a multi-stage fluid filtration apparatus which facilitates a fluid flow by mitigating or eliminating air entrapment between stages.

It is another object of the present invention to provide a means for venting a fluid treatment device or apparatus to promote fluid flow.

It is yet another object of the present invention to provide a low pressure water treatment apparatus, which removes microbiological contaminants while providing a consumer-acceptable flow rate.

It is yet another object of the present invention to provide a gravity-fed water filter which reduces inorganic contaminants, improves taste and odor, and removes or reduces microbiological contaminants.

It is a further object of the present invention to provide a two chambered, gravity fed filter apparatus which filter which may be inserted from a lower chamber.

The invention further relates to a gravity-fed filter apparatus adapted for removal of microbiological contaminants, characterized by a flow rate of at least 30 cm$^3$ per minute.

These and other objects and advantages of the present invention will no doubt become apparent to those skilled in the art after reading the following Detailed Description of the Preferred Embodiments.

DETAILED DESCRIPTION OF THE PREFERRED EMBODIMENTS

Figure 1:
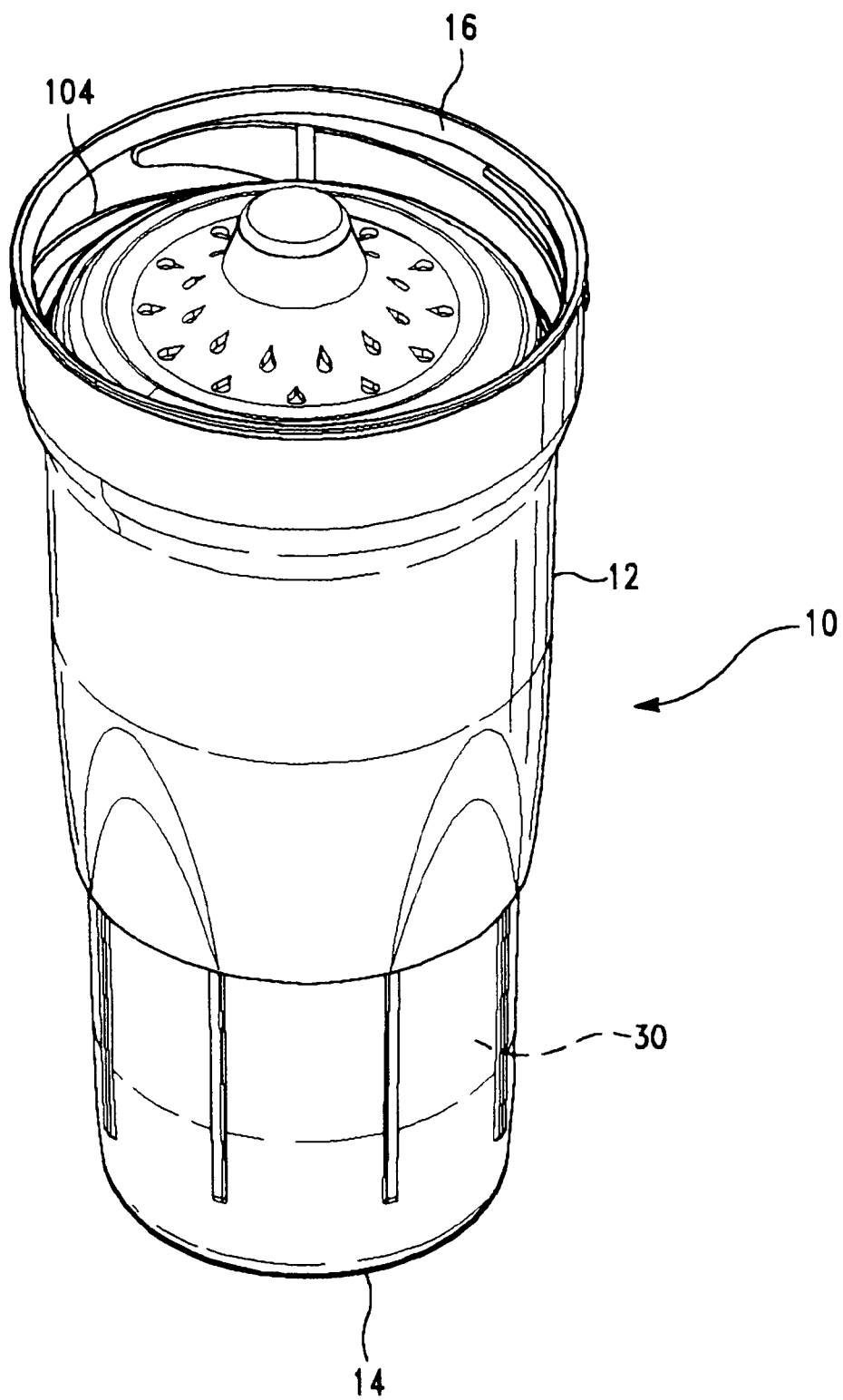
FIG. 1 is a perspective view of a filter cartridge of the present invention.
Figure 2:
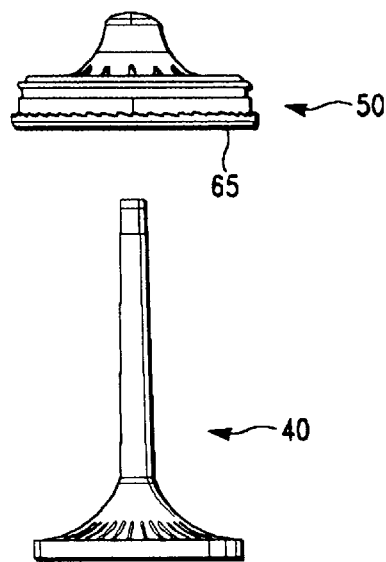
FIG. 2 is an exploded elevational view of the filter cartridge of FIG. 1.

As illustrated in FIGS. 1 and 2, there is a fluid treatment cartridge 10 of the present invention. The cartridge 10 includes, generally, an outer housing or shell 12, a lower filtration module 30, a vent element 40 and filter cap 50. The cartridge 10 comprises an outer housing or shell 12, having a lower filtered water outlet 14, and sealing skirt 16. The housing 12 has a generally hollow interior defining a cavity 18. The filter cartridge 10 is designed and adapted to be utilized with a pitcher 20 (shown in FIG. 3) having an unfiltered water reservoir 22, and a filtered water chamber 24. Referring again to FIG. 2, the lower filtration module 30 occupies a lower portion of the cartridge 10. In one embodiment of the cartridge 10, the module 30 comprises a housing 32 within which is plotted a plurality of hollow fiber filtration elements 34. Such hollow fiber filter elements 34 may be made of a polymeric material made from monomers such as ethylene, propylene, sulfone, ethersulfone, vinylpyrrolidone and mixtures thereof, or other materials known to the art. Furthermore, the lower filtration module 30 may be integral to or part of a corresponding portion of the cartridge 10 such that the module housing 32 is omitted. For example, a plurality of hollow fiber filters elements 34 may be potted directly within the housing 12 of cartridge 10. The lower filtration module 30 may also comprise other filtration media, such as disk or pleated membranes or particulate media, or combinations of media. Such media function by removing unwanted constituents from the fluid; or may act upon the unwanted constituents to change them physically, chemically or biologically to a more desirable (or less undesirable) form; or may add a beneficial constituent.

The use of such purification agents can result in air entrapment within filter cartridges because some agents are hydrophilic ("water-loving") and therefore air-impervious. Since the pressure initially available to a gravity driven filtration system is typically 1.0 pounds per square inch (PSI) or less, air trapped within the filter cartridge is unlikely to be forced out with the effluent water. Rather, because of its buoyancy, air tries to move upward through the cartridge. However, when the air encounters a wetted purification agent with a hydrophilic nature, it becomes trapped due to surface tension at the air/liquid interface. This trapping of air is even more likely to occur in gravity driven systems wherein when the available pressure differential diminishes due to a diminished column or head of water in the reservoir.

Figure 4:
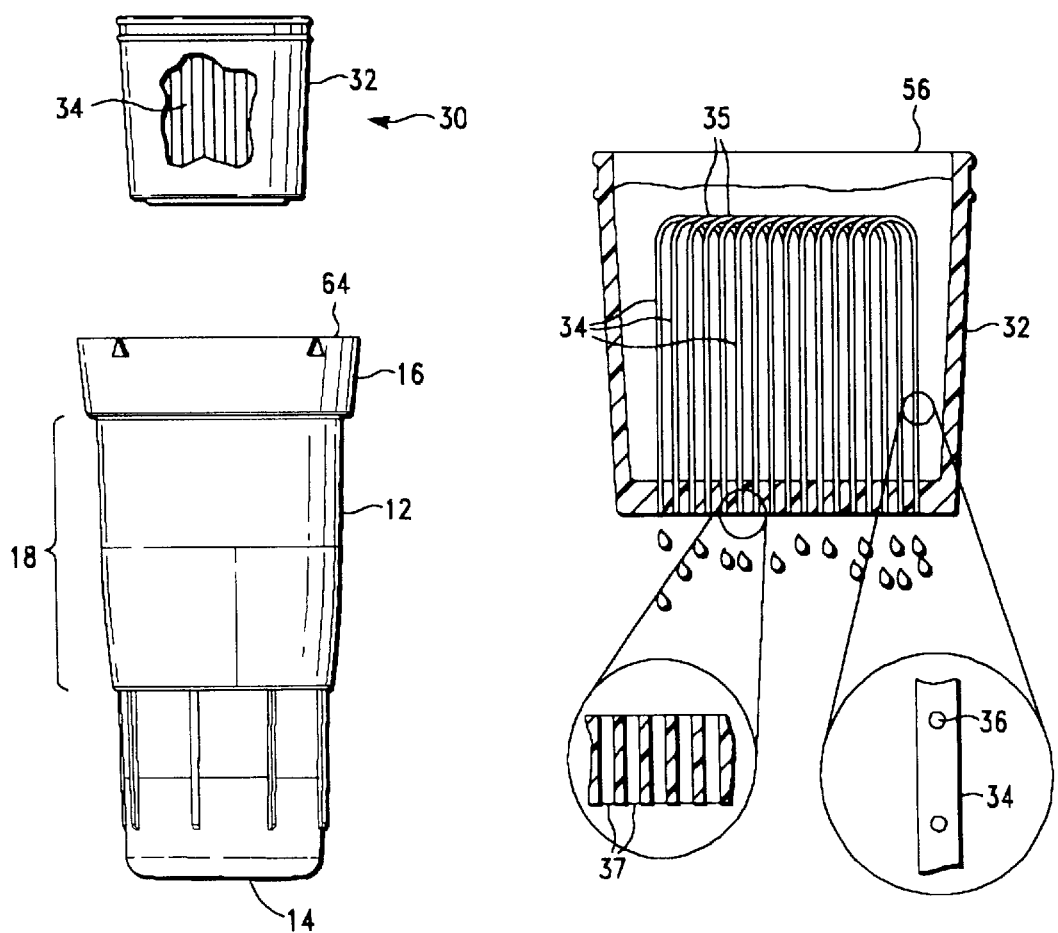
FIG. 4 is a magnified, sectional view of a portion of the filter cartridge of the present invention showing fiber loops.

Within the lower filtration module 30, the hollow fiber elements 34 are preferably arrayed in the form of loops 35, as depicted in FIG. 4. The loops 35 have formed therein a plurality of surface apertures 36 which may range in diameter from about 0.01 to 3 microns. Each loop 35 has two terminal apertures 37, which permit filtered fluid to exit the fiber 34.

Referring to FIG. 4, fluid thus flows from outside the hollow fiber element 34, through the surface apertures 36 and out of the terminal apertures 37. The surface apertures 36 are selected to be smaller than the size of the unwanted contaminant, such that the contaminant, e.g. a microbe or cyst, is filtered out of the fluid. Additionally, flow rates are optimized when the fibers are arrayed in rows having 0.01 mm or greater spacing therebetween to allow release of air or gases trapped between fibers. Examples of spacing geometries in a cylindrical module configuration include concentric rings, or a spiral of fiber bundles. Examples of other configurations include horizontally, vertically or angled fiber arrays which may be regular or irregular and having fibers with one or both open ends. A hollow fiber can be conceptualized as a membrane filter, in that it operates by excluding unwanted contaminants from the interior of the fiber, by virtue of the small size of the apertures 36. A hollow fiber bundle thus presents a membrane surface having very great total surface area to expose the unfiltered fluid. The module 30, in one embodiment contains fiber bundles having a surface area of about 0.08–0.15 m$^2$. As is known to the art, a fluid flow path can be inside-out or outside-in.

In another embodiment of the present invention, fluid flow through the hollow fiber bundles is further enhanced by treating the fiber elements 34 with a surfactant or surfactants. The surfactant treatment acts to increase the hydrophilicity of the fibers, and results in faster flow rates with less pour-to-pour variation in flow. The manner of fiber treatment is not critical; the fiber bundles can be soaked in aqueous solutions of surfactant, or such solutions can be run through the fiber bundles. In either case, the treatment may be performed singly, or repeatedly.

Most preferably, a rinse solution, especially water, follows the treatment. A single surfactant or a mixture of surfactants can be used, and preferably a mixture of nonionic surfactants. Such surfactants may be polyethoxylated alcohols, sulfonates, or sulfates. It has been found, however, that use of a polyvinyl alcohol surfactant does not provide consistent, consumer acceptable flow rates at the operable pressures of gravity-fed pitcher systems, i.e about 0.3 psi or less.

Figure 5:
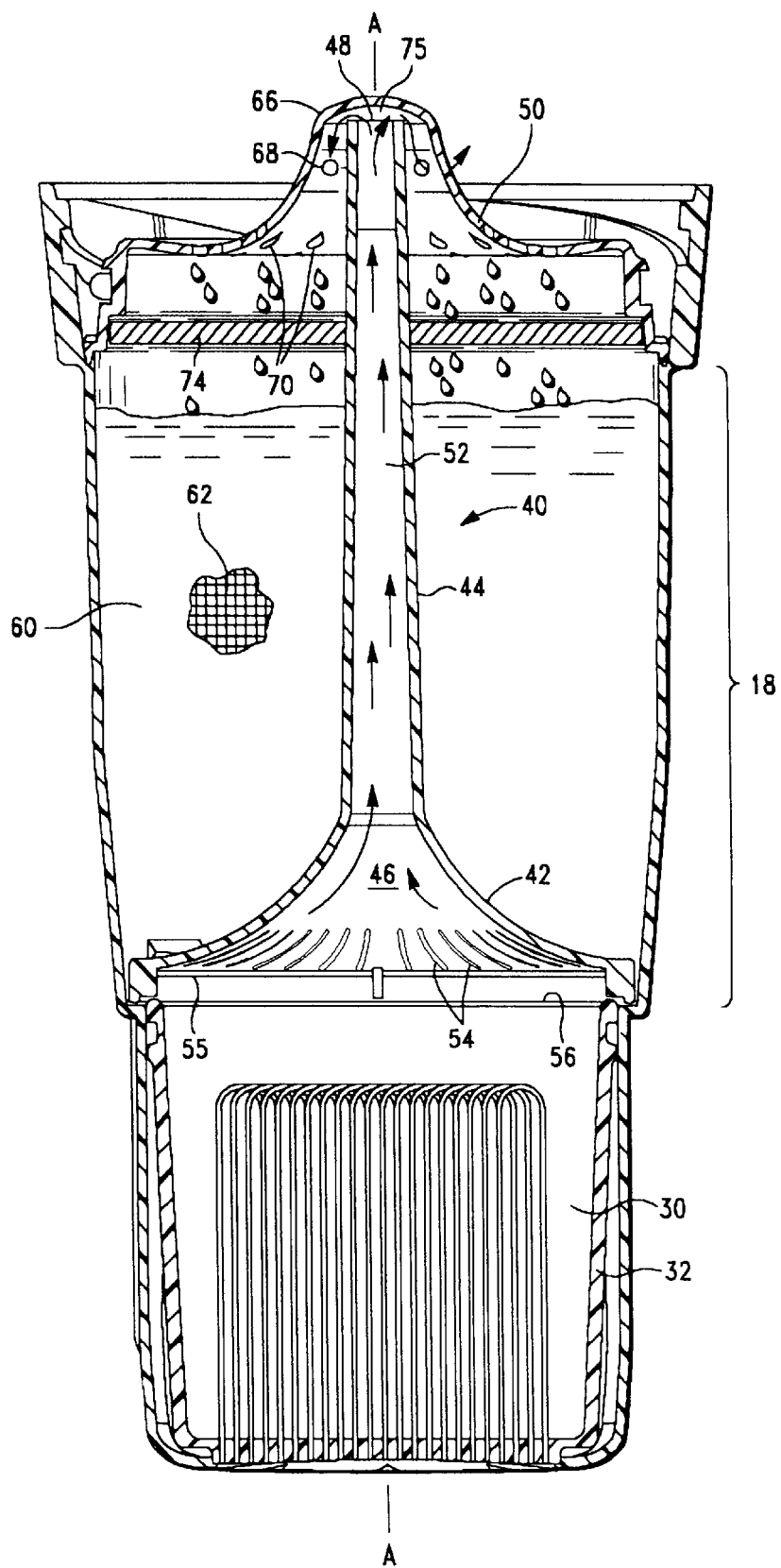
FIG. 5 is a close-up, cut away, elevational view of the filter cartridge of FIG. 1.

Referring to FIG. 5, within the cavity 18, and above the lower filtration element 30 there is a space defining a primary filter media chamber 60. This chamber 60 may be filled, or partially filled with a variety of filtration media 62 to yield a first filtration element acting as a first stage filter. Preferably, the chamber 60 contains a granular activated carbon, an ion exchange material, or a mixture thereof. Optionally, bacteriostatic material such as silver, copper, zinc or materials, which kill or inhibit bacteria through oxidation/reduction may be included with one or more of the filter media 62.

The vent element 40 comprises a tangential fluid diverter 42, a vent tube 44, a lower air collection space 46 and an upper vent port 48. The vent tube 44 includes a central aperture 52 to permit the free passage of air or gases from the lower air collection space 46 therethrough, and to exhaust through the upper vent port 48. The tangential fluid diverter 42 includes a plurality of openings 54 spaced circumferentially thereabout, through which water may flow. The geometry of the openings 54 is not critical and they may be circular, oblong or slot-like, for example and may be spaced regularly, or irregularly. A lower surface 55 of the tangential fluid diverter 42 is in proximity to or abutting an upper intake surface 56 of the fine filtration module 30. It can be seen that the vent element 40 occupies a portion of the central chamber 60 which is otherwise filled with the filter media 62. In one embodiment, the vent tube 44 extends upwardly through a central axis AA of the filter cartridge 10, however a variety of geometries are possible and within the scope of the present invention. The vent element 40 need not be a discrete structure but all or part thereof may be formed by other structures within the filter 10. For example, the filter media 62 may include or comprise a self supporting carbon, plastic or mixture thereof, which would permit all or part of the vent element 40 to be formed by void space within the media 62. In such a case supplemental structure could be added as necessary to achieve the desired result. The filter medium could also be modified to achieve the desired flow characteristics, i.e. by selective addition of additives to the media, or by inclusion of structural elements.

The vent element 40 provides a means of venting air or gases countercurrently to a flow of water or other fluid. As implemented for a gravity fed water filtration pitcher of the type depicted in FIG. 3, the fluid is water and the vented gas is air, which is vented upwardly while water flow is downward throughout the filter 10.

The tangential fluid diverter 42 is generally in the form of an inverted funnel cone, or conic section which viewed in cross-section, is angled from five to eighty-five degrees relative to the vertical. The tangential fluid diverter 42 is preferably radially symmetrical. Viewed in cross section, the tangential fluid diverter may be conical, frustro-conical, polyhedral, tetrahedral, pyramidal, parabolic, hyperbolic, inversely parabolic and inversely hyperbolic. The surface may be linear, convex curved, concave, or some combination thereof. A variety of shapes are suitable as long as the surface of the tangential flow diverter 42 changes the fluid flow vector from vertical to one having some horizontal component. Multiple curves are also suitable as long as the surface imparts an inward component, i.e. along line $V_x$ (depicted in FIG. 7), to the direction of the water flow.

In another embodiment of the vent element 40 the apertures 54 are angled and/or curved to impart a circular or swirling motion to the fluid as it passes therethrough. Such circular or swirling motion also results in turbulent flow, and the release of entrained air. Additionally, circular flow may be imparted by the use of vanes (not shown) positioned on the inner surface of the tangential fluid director 44, or on the inner surface of the lower filtration module 30. Such vanes could be either flat or curved and would be positioned to deflect fluid inwardly and/or to induce rotational flow.

Referring again to FIGS. 2 and 5, the filter cap 50 seals the cartridge 10 about an upper surface 64 thereof. The filter cap 50 includes an inner sealing surface 65 and a vent cone 66 at the highest portion thereof. Below the vent cone 66 there is formed into the cap so one or more apertures 68, through which air can escape during the venting process. Filter cap 50 further includes a plurality of water inlets 70 formed therethrough. In one embodiment, a scrim or containment medium 74 is positioned intermediate to the filter cap 50 and the filter media 62, and acts to retain fines from the media 62. The scrim 74 may be woven or non-woven material, such as a polyester, or a polyolefin, or a polyolefin treated to be hydrophilic, as is known in the art, or the scrim 74 may be omitted entirely.

In operation, water flows from the pitcher reservoir 22 under the influence of gravity (or aided by some other source of pressure) through a plurality of the water inlets 70 of the filter cap 50 thence entering cavity 18 filled with primary filtration media 62. Water flows through the primary filtration media 62 and impinges upon the tangential fluid diverter 42. As the flow of fluid passes through the openings 54, it is translated from an essentially vertical flow to one which has a horizontal component as represented by $V_x$ in FIG. 7. The tangential fluid diverter 42 separates the flow into two regions: a first region of liquid flow at the outer area of the fluid diverter 42 and a second region of non-liquid flow proximal to the lower air collection space 46, wherein air is collected. The geometry of the fluid diverter 42 effectively floods the lower stage with liquid, thus forcing the air to the region of non-liquid flow at the lower air collecting space 46 within the center of the cone formed by the fluid diverter 42. The collected air is forced, by the (static) pressure of the water column in the space 60, from the air collecting space 46, up the aperture 52, exiting at vent port 48. The air exiting the vent port 48 is trapped under the vent cone 66 and forced out the aperture(s) 68 by the pressure induced by the impinging fluid. As shown in FIG. 5, a space 75 is formed immediately under the vent cone 66 and above the vent port 48. This space 75 acts to maintain an air-to-air interface extending from the space 75, through the aperture 52 of the vent tube 44 and into lower air collecting space 46. Such air-to-air interface facilitates the venting or removal of air or gasses from within the filter 10 by equalizing gas (air) static pressure to ambient pressure, permitting in free flow of fluid (water) downward through the filter 10.

Referring to FIGS. 4 and 5, the spaces formed between fiber loops 35 can trap air, resulting in bubbles which then impede the flow of fluid through the fiber, initially diminishing the flow rate of the system. As additional fluid enters the system, fluid pressure builds up and, the static pressure of the fluid will force the air bubble upwards through the aperture 52 of the vent tube 44, eliminating the disadvantage inherent in a counter current flow of air and water. The flow of fluid becomes turbulent as it passes through the apertures 54 and the turbulent flow acts to release entrained gases, which then collect in the lower gas collection space 46 of the vent element 40.

Figure 7:
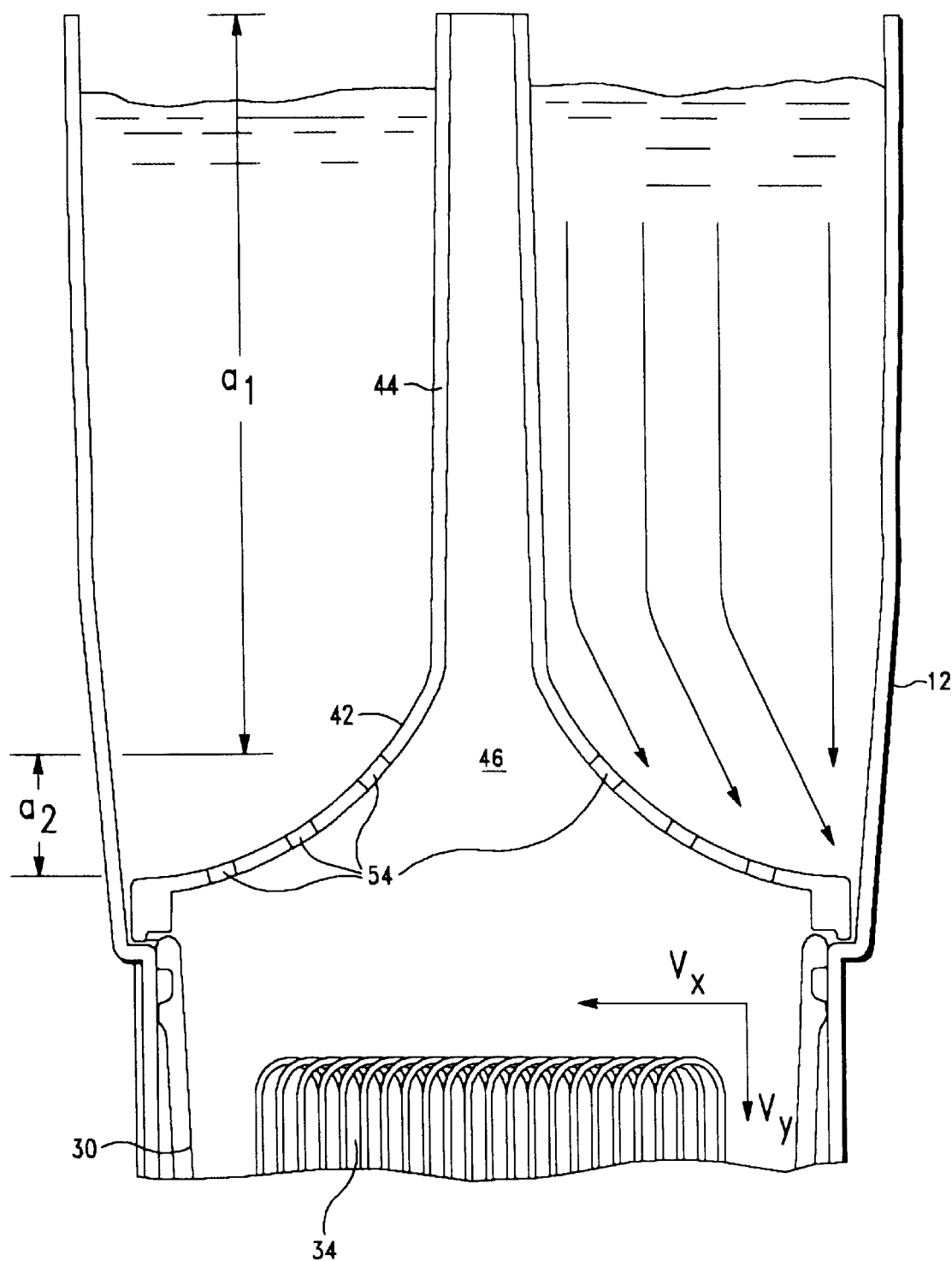
FIG. 7 is an idealized schematic side elevational view of fluid flow through the filter of the present invention.

FIG. 7 is an idealized two-dimensional schematic of fluid flow through the tangential flow diverter 42 of the vent element 40. It can be seen that in region $a_1$ (the area of the cylinder defined by the filter housing 12, less the area occupied by the vent tube 40) the Normal direction of fluid flow $V_y$ is parallel to the vent tube 40 and side walls 12, or with reference to the filter 10, downward. This fluid flow has a velocity $V_1$ imparted by the acceleration of gravity. At the surface of the flow diverter 42, the cross-sectional area for fluid flow is reduced to $a_2$. The decreased cross-sectional area results in increase in velocity to $V_2$, in accordance with Bernoulli's principle. In the region defined by $a_2$, the fluid flow is streaming, i.e. it exhibits altered direction and velocity. As water level rises, the horizontal component of fluid flow i.e. $V_x$ increases which has the effect of compressing air trapped within the air collecting region 46 and urging it out the vent tube 44.

Figure 6:
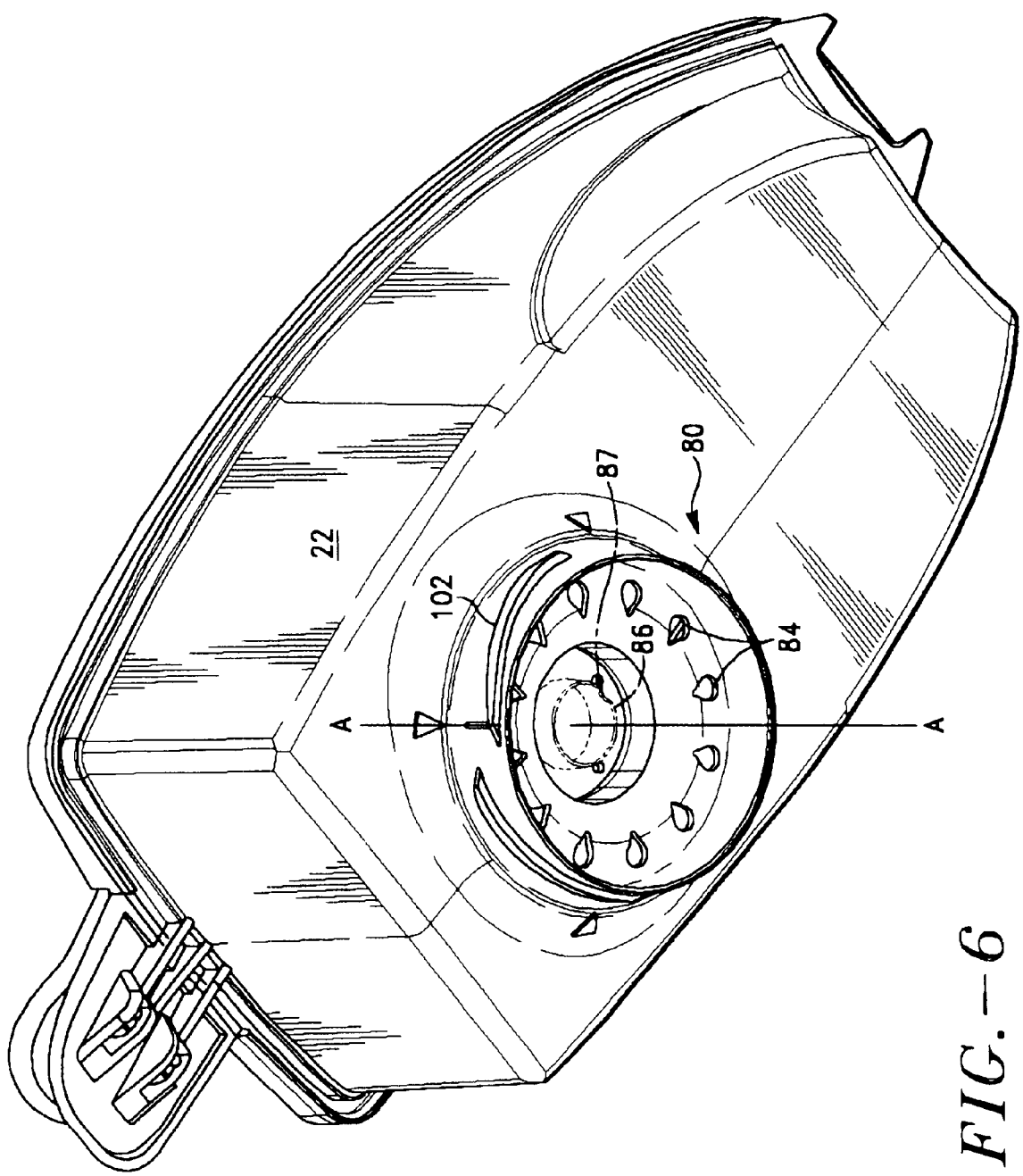
FIG. 6 is a perspective view of a lower portion of the reservoir of FIG. 3, showing the means for securing the filter cartridge to the pitcher reservoir.

In one embodiment of the upper reservoir 22 of the pitcher 20 to which the filter 10 attaches depicted in FIG. 6, there is an annular skirt 80 formed into a lower portion of the upper reservoir 22 of pitcher 20. The annular skirt 80 is constructed and arranged to mate with the corresponding skirt 16 of the filter 10 to provide a fluid tight seal. Within the periphery of the annular skirt 80 there are a plurality of radially arranged apertures 84 formed through the reservoir 22 to permit the free passage of fluid downward therethrough. In an alternative embodiment of the filter 10, there is at least one aperture 68 formed near or at the top of the filter cap 50, preferably formed to be directly above the central aperture 52 of the vent tube 44. In this embodiment the air-to-air interface is maintained by an annular airlock skirt 86, (shown in phantom in FIG. 6), formed into a lower surface of the reservoir 22 and coaxial with the annular skirt 80. When the filter 10 is secured to the reservoir 22, in this embodiment the annular airlock skirt 86 is positioned and configured to overlay the air aperture 68 to define an airlock therebetween. Air from the annular airlock skirt 86 is thus permitted to exit unimpeded around the periphery of the airlock skirt 86, and may be aided by a notch 87 form therein.

The sealing skirt 16 includes structure known in the art for securing two objects, either permanently, or releasably, that is, the sealing skirt 16 preferably permits repeated locking and unlocking of the filter cartridge 10 to corresponding skirt 80 of the reservoir 22. In one embodiment, the sealing skirt 16 includes threads 102, which cooperate with threads 104 of the filter 10, as illustrated in FIGS. 1 and 6. Alternative structures may comprise a bayonet type mount, pin and track, compression fit or a magnetic mounting.

Since the filter 10 is intended to remove microbiological contaminants, it is important to maintain microbiological integrity of the connection between the filter 10 and reservoir 22. Furthermore the reservoir 22 and filter 10 are designed so that the filter 10 is secured to the reservoir 22 by attaching the filter 10 to the annular skirt 80 from a bottom or lower surface, as depicted in FIGS. 3 and 6. This is to be contrasted with systems where the filter 10 is inserted from an upper surface of the reservoir 22 through an aperture sized to permit the filter 10 to pass therethrough, for example as disclosed in U.S. Pat. No. 4,969,996. In the former systems, filter size is dictated by the dimensions of the aperture through which the filter is inserted, and by the distance from the reservoir bottom to the bottom of the pitcher. Because the filter 10 of the present invention does not have to pass through an aperture in the reservoir 22, the filter 10 is not limited in size, for example in diameter. Further the diameter of the filter may vary, as from top to bottom, such that the top is larger in diameter than the bottom or vice versa. This makes it possible to improve filter performance, longevity, features and or aesthetics by modifying filter size as needed. Additionally, the attachment means of the filter 10 of the present invention allows for a variety of filter orientations besides purely vertical. Thus the filter may be inclined or fully horizontal. A significant benefit afforded by the horizontal arrangement is that the filter can be configured to lay flat on the bottom of a gravity-fed pitcher, thus maximizing the pressure head available to force water therethrough. In this instance, the filter would be in fluid communication with the reservoir through some intermediate coupling means.

It is to be noted that the benefits afforded by the venting structures described herein are not limited to those filters, which attach in the manner described above. Rather, the venting structure can provide advantages to filters regardless of means of attachment to the reservoir, or orientation within the pitcher.

Experimental

Table 1 is a comparison of flow time (in seconds) of a two stage water filtration module, unmodified, with the vent element 40 in place, and with the vent element 40 plus a surfactant treatment of the hollow fibers. In all cases, the hollow fiber module was a commercially available module manufactured and sold by Mitsibishi Rayon Co., Ltd., under the trademark KC-140. The fiber loops were polyethylene, and had a total surface area of 0.15 $m^2$. One liter of water was poured thorough the filter, and at least ten repetitions were done for each filter condition. It can be readily seen that the mean flow times without the vent element are about double those for the filter with the vent element, and nearly four times greater than those with the vent element and surfactant treatment. Further, the standard error decreases sharply for the filter with the vent element and surfactant treatment. This demonstrates the consumer-perceivable benefit of consistency in rapid water pour-through.

TABLE I

|  | Mean Flow Time (sec) | Standard Error |
|---|---|---|
| Hollow Fiber Alone | 1296 | 12.5 |
| Hollow Fiber plus Vent structure | 683 | 12.4 |
| Hollow Fiber, Vent structure, surfactant treatment | 488 | 6.9 |

In the table above, the modules used for the tests described in the first and second rows were polyethylene hollow fiber, manufactured by Mitsubishi Rayon, pretreated with a vinyl alcohol/vinyl acetate copolymer.

The surfactant treatment of the present invention (the third row of Table 1 above) comprised an average of the following two methods:

Method 1. Each filter module was soaked for five minutes with agitation in a solution that was a mixture of 0.5% of each of two nonionic surfactants. The modules were then rinsed thrice successively by soaking for five minutes with agitation in clean tap water.

Method 2. The membrane modules were mounted inside sealed filter housings, and 1 liter of a mixture of 0.5% of each of two surfactants was allowed to pass through at a rate of 10 minutes per liter. The modules were then rinsed thrice successively by passing through 1 liter of clean tap water at a rate of 10 minutes per liter.

The nonionic surfactants were an extoxylated alcohol having an alkyl chain length averaging 11 carbons and about 5 moles of ethylone oxide per molecule, for example a Neodol 1-5, marketed by the Shell Chemical Company and a sulfate surfactant having a 10–12 carbon alkyl group with an average of 6 moles of ethylene oxide per molecule, sold by the Texaco Chemical Company under the trademark Surfonic L12-6.

After either treatment method, the modules were allowed to air dry after which they were ready for use.

While described in terms of the presently preferred embodiment, it is to be understood that such disclosure is not to be interpreted as limiting. Various modifications and alterations will no doubt occur to one skilled in the art after having read the above disclosure. Accordingly, it is intended that the appended claims be interpreted as covering all such modifications and alterations as fall within the true spirit and scope of the invention.

What is claimed is:

1. A gravity-fed fluid filter, comprising:

a housing having at least one fluid entry port and at least one filtered fluid exit port;

a first filtration medium disposed intermediate to said fluid entry port and filtered fluid exit port;

a second filtration medium disposed intermediate to said first filtration medium and said filtered fluid exit port;

a venting system disposed intermediate to said first and second filtration media, said venting system including a tangential fluid diverter configured and arranged to separate a fluid flow into a first region of liquid flow and a second region of non-liquid flow to thereby vent gases therefrom, said gasses being vented countercurrently to said fluid flow whereby an air-to-air interface is maintained.

2. The filter of claim 1, wherein said first filtration medium includes carbon and said second filtration medium includes a membrane.

3. The filter of claim 2, wherein said first filtration medium includes an ion-exchange resin and said second filtration medium comprises a plurality of hollow fibers.

4. The filter of claim 1, wherein said tangential fluid diverter is in the form of an inverted funnel.

5. The filter of claim 1, wherein said filter yields an effluent rate of at least 30 $cm^3$/min at a pressure differential of 1.0 psi or less.

6. The filter of claim 1, wherein said venting system includes air collection means and air exhausting means.

* * * * *